United States Patent [19]

Hwo

[11] Patent Number: 5,623,012
[45] Date of Patent: Apr. 22, 1997

[54] PELLETIZING AID FOR POLYMERS

[75] Inventor: Charles C. Hwo, Sugar Land, Tex.

[73] Assignee: Shell Oil Company, Houston, Tex.

[21] Appl. No.: 574,805

[22] Filed: Dec. 19, 1995

[51] Int. Cl.$^6$ .................................................. C08K 5/098
[52] U.S. Cl. ........................ 524/398; 524/399; 524/400
[58] Field of Search .................................. 524/394, 398, 524/399, 400

[56] References Cited

U.S. PATENT DOCUMENTS 4,359,544  11/1982  Hwo et al. ............................ 524/232
5,206,292  4/1993  Hwo et al. ............................ 525/240

*Primary Examiner*—Peter A. Szekely
*Attorney, Agent, or Firm*—Y. Grace Tsang

[57] ABSTRACT

The addition of a synergistic pelletizing aid package of HDPE and metallic fatty acid surfactant to the water bath to minimize the agglomeration of polyolefin pellets in an underwater pelletizing process.

13 Claims, No Drawings

PELLETIZING AID FOR POLYMERS

FIELD OF THE INVENTION

This invention generally relates to the pelletization of polyolefin polymers. More particularly, the invention relates to the addition of a small amount of a mixture of an organic metallic surfactant and a high density polyethylene (hereinafter HDPE) polymer, wherein the metallic surfactant and the polymeric nucleant cooperate in a synergistic fashion in improving the pelletization of the polyolefin polymers.

BACKGROUND OF THE INVENTION

Pelletization of polyolefin polymer, for example, polybutene-1 copolymer, especially high melt flow and high ethylene (ethylene content higher than 0.75 wt %) butene-1-ethylene copolymer, from molten state has been very difficult when using either the underwater face cutter or the strand cutting pelletizer. The problem appears to relate to the slow crystallization rate or solidification rate of these polymers which exhibit extreme tackiness in pelletizing. It is known that as the pellets leave the cutting blades, they are very clear and tacky, and collide with other pellets to form agglomerates. With a longer residence time, the pellets change to an opaque color, as they complete their crystallization, become hard and lose their tackiness. These agglomerates frequently plug the pelletizer bowl and the spin dryer. The extrusion line has to be shut down in order to clean the plugged section resulting in undesirable production interruptions. Also, the high number of pellet marriages shown in the final product is not acceptable in the customers' fabrication process.

Various attempts have been made to solve or to minimize this problem of undesired pellets agglomeration. Using polymeric nucleants, including polyolefinic nucleants such as polyethylenes (e.g. HDPE powder such as MICROTHENE®) as an external pelletizing aid to eliminate the surface tackiness is known in the art. Polyolefinic powder nucleants typically have density less than water and thus often float on the surface of the water-bath or tank which in turn results in processing disruptions requiring the occasional cleaning up of equipment and work environment. The success of this method also depends on good dispersion and suspension of HDPE in the slurry water. Therefore, it generally requires vigorous stirring, e.g. using portable mixers, to obtain effective benefit of the HDPE as a pelletizing aid. This method of reducing surface tackiness is very messy and labor intensive. Even under the best of circumstances, a significant fraction (about 20%) of the production has to be discarded due to poor pellet quality and pellet agglomerations.

The use of organometallic surfactants to minimize the pellet agglomeration problem is also known in the art. However, when these surfactants are used at the effective level, it often results in severe foaming problems, and the foam may overflows from the water tank to the floor and thereby causing messy operation and unsafe environment through the obstruction of the view. The combination of a defoamer such as FOAMTROL® and an organometallic surfactant such as zinc stearate has been used with some success. This comination has the drawback of the potential carcinogenic nature of FOAMTROL®. FOAMTROL® is available from Betz Industrial, 4636 Somerton Road, Trevose, Pa. 19047, and the chemical formulation of which is proprietary information of Betz Industrial.

U.S. Pat. No. 4,359,544, assigned to Shell, proposes the use of a nucleating agent package in the polymer melt as pelletizing aid, which package is a mixture of HDPE and stearamide. However, both HDPE and stearamide do not disperse well in water, and thus do not function well in a water bath as pelletizing aids.

U.S. Pat. No. 5,206,292, assgned to Shell, proposes the use of oxidized high density polyethylene powder to minimize the agglomeration of freshly manufactured polyolefin pellets. However, oxidized HDPE is not approved by FDA for applications involving direct food contact.

Thus, there continues to exist the need for new and better methods and/or agents for preventing or minimizing pellet agglomeration in underwater pelletizing operations of polyolefins, especially high melt flow polyolefins.

It has now been discovered that a combination two specific additives cooperate in a synergistic fashion to substantially reduce agglomeration of pellets while dispersing effectively with minimum foaming.

SUMMARY OF THE INVENTION

It is a general object of the invention to facilitate the pelletization of polymers.

It is a specific object of the invention to provide a pelletizing aid package and methods to facilitate the crystallization from the melt of polyolefin polymers and minimize the agglomeration of freshly manufactured polyolefin pellets.

Accordingly, it is now provided a method for minimizing the agglomeration of freshly manufactured polyolefin pellets, such as poly-1-butene homo- or copolymer pellets, which comprises adding an effective amount of a pelletizing aid package having an organic metallic surfactant and HDPE nucleant to a cooling device comprising a cooling agent, such as cold water, and freshly prepared pellets during manufacturing the pellets.

DETAILED DESCRIPTION OF THE INVENTION

Generally speaking, the present invention relates to a method for minimizing the agglomeration of freshly manufactured polyolefin pellets, particularly high melt flow polyolefin pellets, comprising adding a suitable quantity of a high density polyethylene and a suitable quantity of a metallic fatty acid surfactant to a cooling device comprising a cooling agent and freshly prepared polyolefin pellets during the pelletizing stage.

Broadly speaking all polymers are suitable in the practice of this invention. The term polymers as used herein, unless otherwise specified, includes homopolymers, copolymers, terpolymers and all other known combinations or forms of polymeric materials, including polymers which are elastomeric in nature. The homopolymers generally have less crystalization problems, and are not of the greatest concern.

Polyolefin copolymers typically exhibit slower crystallization rates leading to longer crystallization times. This is usually observed by their low crystallization temperatures which is believed to be caused by the alteration of the crystalline morphology of the primary polymer component. As has been earlier noted, the excessive stickiness resulting from slow crystallization is undesirable. This generally occurs in polyolefin copolymers made up from semi-crystalline polymers such as polyethylene, polypropylene, polybutylene, polyester, polyethylene terephthalate, ethylene vinyl acrylate, and elastomeric polymers such as KRATON® (Styrene-diene block copolymer) and rubber. Of particular concern are very high melt flow copolymers of butene-1 and ethylene (butene-1-ethylene copolymers).

Butene-1-ethylene copolymers including methods for their preparation are known in the art. Illustrative and non-limiting examples of butene-1-ethylene copolymers suitable in the practice of this invention include those contain from about 0.1 to 8.0 wt % ethylene. Preferably, such butene-1-ethylene copolymers contain from about 0.1 to 7 wt % ethylene, and have melt indices ranging from about 0.2 to 5000 dg/min. Although the present method is particularl useful for pelletizing high melt flow butene-1-ethylene homo- or copolymers, it is also useful for pelletizing low melt flow and medium melt flow butene-1 homo- or copolymers.

The following terms when used in this specification including claims shall have the following meaning:

Low Melt Flow Polybutylene means polybutylene having a melt flow of less than 10 dg/min. measured by ASTM D 1238 condition E.

Medium Melt Flow Polybutylene means polybutylene having from 10 to 100 dg/min. measured by ASTM D 1238 condition E.

High Melt Flow Polybutylene means polybutylene having a melt flow of greater than 100 dg/min. measured by ASTM D 1238 condition E.

High Melt Flow polyolefin means polyolefin having a melt flow of greater than 100 dg/min. measured by ASTM D 1238 condition E.

Pelletizing aid package suitable in the practice of this invention generally include a combination of an organic metallic surfactant, specifically a fatty acid metallic surfactant, and a high density polyethylene.

Particularly suitable fatty acid metallic surfactants include, but by no means limited to, salts of Group IA metal (Li, Na, K, Rb, Cs Fr), Group IIA metal (Be, Mg, Ca, Sr, Ba, Ra), aluminum (Al), zinc (Zn) and cadmium (Cd) with fatty acid having 12 to 22 carbon atoms. Illustrative and non-limiting examples of suitable fatty acid metallic surfactants include zinc stearate or oleate, aluminum stearate or oleate, calcium stearate or oleate, lithium stearate or oleate, and sodium stearate or oleate.

Suitable high density polyethylene (HDPE) is characterized by a density at 25° C. above about 0.93 g/cc and preferably at least about 0.95 g/cc. A particularly suitable HDPE, for example is Microthene® FA520 having a density of 0.96, a melt indexof 17 dg/min. determined by ASTM 1238 condition E, average particle size of less than 20 microns, and a Vicat softening Point of 128 degree centigrage measured by ASTM D1525. A wide variety of suitable high density polyethylenes are commercially available and methods for their preparation are well known in the art. They may be prepared by polymerization processes employing Ziegler type coordination catalyst, supported chromium oxide catalysts, or metallocene catalysts.

The relative amounts of pelletizing aids are listed below in percent by weight of the cooling agent:

|  | Preferred | More Preferred | Most Preferred |
|---|---|---|---|
| Surfactant | 0.01 to 0.6 | 0.04 to 0.4 | 0.07 to 0.2 |
| HDPE | 0.03 to 1.0 | 0.06 to 0.6 | 0.09 to 0.4 |

Freshly prepared pellets as used herein is defined as the material such as polymers transformed from its fluid or molten state to a finish solid shape which is designed for easy processing in the subsequent part fabrication. The equipment used for the transformation is generally an extruder and die, through which a certain shape of polymer melts are molded and solidified. In commerical practice, the solidification of the polymer melts are expedited via a cooling device to remove the heat effectively.

Various other conventional additives can also be listed in the practice of this invention. These additives include corrosion inhibitors, foaming inhibitors, buffers, and neutralizers.

Cooling agent as used herein is defined as a medium which functions as a material to remove the heat of the other materials so that this other material can be transformed from molten state to the solid state at a faster or more effective rate. Generally speaking, the cooling agent can be any fluid or substance that can absorb or conduct heat. For example, the cooling agent can be water or other fluids in a continuous circulation used to absorb heat through convection.

Subsequent to adding the processing aid package into the coolant, the dispersion of the HDPE, pellet agglomerations (marriage), and foaming can be observed in order to determine the efficacy of the pelletizing aid package. Successful practice of this invention will be specifically evidenced by good dispersion of the HDPE, minimal foaming of the cooling medium, and the improved pellet quality including reduced pellet agglomeration. Generally, the successful practice of this invention substantially reduces or eliminates the problems caused by or associated with slow or inadequate polymer crystallization rate.

The following Illustrative non-limiting embodiments and Tables further illustrate the various aspects of the invention.

ILLUSTRATIVE EMBODIMENTS

In the following illustrative embodiments, a Welding Engineers twin screw extruder (133 mm diameter screw) and a Gala underwater pelletizer were used. The slurry water temperature was controlled by the chilled water supply system. The cooling water, temperature was about 25° C. Additional cooling can be done either by adding ice cubes to the water bath manually or by installing a chiller.

Illustrative Embodiment 1—1.5 wt % HDPE

Duraflex® polybutylene DP8510 was mixed with 1.0 w % 2,5-dimethyl-2,5-di (t-butylperoxy) hexane using a Henschel mixer for two minutes. It was then charged at 55 wt % with another stream of DP8510 at 45 w % through a hopper to a 133 mm twin screw extruder. The extruder temperatures are as listed in Table I. The molten materials were then pumped through a multiple-hole die and cut into pellets with an average pellet size of 38 pellets per gram by a 6 blade circular knife in the circulating slurry water. The melt viscosities of the pellets were measured to determine whether the pellets met the product requirements or specifications, i.e. less than 500,000 cent: poise (cps) at 275° F. and 6,500 to 10,000 cps at 350° F. The screw speed (rpm) of the extruder and extrusion temperature were adjusted accordingly so that the melt viscosity of the pellets met such specifications. The slurry water contained 1.5 w % Microthene® high density polyethylene (HDPE) powder, FA750. The slurry water along with the pellets were pumped into a 5000 gallon conical metal crystallization tank. An agitator was used to stir the water in the tank in order to disperse the HDPE powder so that the powder can be effective in preventing the marriage (i.e. sticking together) of the pellets.

The pellets along with the slurry water were then over flown to a screen to separate the pellets from the slurry water. The pellets were then passed through a spinning dryer and thereafter transferred to shaking screen and classified according to the size of pellets. The pellets having sizes within the specification were collected in a box. The slurry water was recirculated through a transferring pipe to the pelletizing knife housed in a sealed hub. The agitator was set to operate at close to its maximum speed in order to vigorously stir and disperse the HDPE powder well in the water to prevent pellets from sticking each other. At this 1.5 wt % concentration of HDPE powder, a high percentage of the HDPE powders were floating at the surface of the water in the tank and overflew to the floor which was messy and hence not desirable in operation.

Note: Duraflex® polybutylene DP8510 is a polybutylene ethylene copolymer (ethylene content of about 5.5 wt %) with a melt index of 45 dg/min and is available from Shell Chemical Company, Houston, Tex., U.S.A. Microthene® FA750 is a high density polyethylene with a density of 0.955 g/cc, Melt Index of 12.0 dg/min. measured by ASTM 1238 Condition E, average particle size of 20 microns, Vicat Softening Point of >100 degrees Centigrage measured by ASTM D1525, and is available from Quantum Chemical, Cincinnati, Ohio, U.S.A.

TABLE 1

Processing Condition Using Cold Water Pelletizer For Illustrative Embodiments 1 through 7

Extruder: Twin screws with 133 mm in screw diameter.
Extruder Temperatures (°F.):

| Zone | 1 | 2 | 3 | 4 | 5 | 6 | 7 | 8 |
|---|---|---|---|---|---|---|---|---|
| Number | 275 | 300 | 300 | 350 | 350 | 200 | 200 | 200 |

Die Temp. (°F.): 200   Adapter Temp. (°F.): 250
Melt Pressure (psi): 600   Screw RPM: 290
Pelletor Knife Speed (rpm): 1500   Number of Blade for the Knife: 6
Die Hole Size: 0.097"   Number of Die Holes: 150
Extruder Output Rate (lb/hr): 2000

Note: The reported zone temperatures are Extruder Barrel Temperatures in °F.

Illustrative Embodiments 2 and 3—1.0 wt % HDPE—0.3 wt % HDPE

The same experimental steps were conducted as Illustrative Embodiment 1, with the exception that 1.0 wt % and 0.3 wt % respectively of HDPE powders were added to the slurry water. At 1.0 w % of concentration, the pellets began to stick themselves to a marginally acceptable level of pellet marriage.

The pellet marriage level increased to unacceptable level when the concentration of HDPE powder is reduced to 0.3 wt %, although the dispersion of the HDPE was improved.

Illustrative Embodiment 4—1.0 wt % Zinc Sterate

The same experimental steps as described in the Illustrative Embodiment 1 were repeated except a zinc stearate powder instread of HDPE at 1.0 w % was added to the slurry water. There was very minimal pellet marriage observed. However, severe foaming occurred and the foams overflew the water tank to floor causing several visual obstruction in the production operation and safety concerns. A defoamer, Foamtrol® had to be used. Unfortunately, such effective defoamer is a cancer suspect substance and a new safe defoamer is yet to be discovered.

Illustrative Embodiments 5 and 6—0.6 & 0.12 wt % of Zinc Stearate

The same experimental steps as described in Illustrative Embodiment 4 were repeated, except the concentrations of zinc stearate were at 0.6 wt % and 0.12 wt % respectively. It was found that at the concentration of 0.6 wt %, the degree of pellet marriage was marginally acceptable but the foaming problem is still severe and at 0.12 w % of zinc stearate, the pellet marriage level was not acceptable although the foaming was very minimal.

Illustrative Embodiment 7—0.3 wt % HPDE & 0.12 wt % Zinc Stearate

The same experimental steps as described in Example 1 were carried out, except a combination of 0.3 wt % of HDPE powder and 0.12 wt % zinc stearate powder was added to the slurry water. It was surprisingly found that with this combination of processing aids, both pellet marriage and foaming were very minimal and a low agitation speed can be used. Therefore, with the combination of HDPE powder and zinc stearate powder, the commercial production of polymeric pellets which are extremely sticky during the pelletization process has become very viable.

The test results from the above Illustrative Embodiments are further summarized as in Table 2.

TABLE 2

Summary of Results for Illustrative Emboidiments 1 through 7

| Illustrative Embodiment # | HDPE w % | Zinc Stearate w % | Performance | | |
|---|---|---|---|---|---|
| | | | Foaming | Pellet Marriage | HDPE Disper sion |
| 1 | 1.5 | 0 | No | Slight | Poor |
| 2 | 1.0 | 0 | No | Moderate | Poor |
| 3 | 0.3 | 0 | No | High | Fair |
| 4 | 0 | 1.0 | Very Bad | No | Good |
| 5 | 0 | 0.6 | Bad | No | Good |
| 6 | 0 | 0.12 | Slight | High | Good |
| 7 | 0.3 | 0.12 | Very Slight | Very Low | Good |

From the TABLE 2 above, it can be readily seen that the addition of both HDPE and zinc stearate has synergistic effects. Comparing Illustrative Embodiment 3 and 6 to Illustrative Embodiment 7, it can be seen that using 0.3 wt % of HDPE or 0.12 wt % of zinc stearate alone resulted in very high pellet marriage rate, compared to using the combination of 0.3 wt % HDPE with 0.12 wt % zinc sterate resulted in very low pellet marriage rate. Thus, synergism of the present invention is readily shown.

While this invention has been described in detail for the purpose of illustration, it is not to be construed as limited thereby but is intended to cover all changes and modifications within the spirit and scope thereof.

What is claimed is:

1. A method for minimizing the agglomeration of freshly manufactured polyolefin pellets comprising adding an effective amount of pelletizing aid package consisting essentially of a high density polyethylene and a fatty acid metallic surfactant to a device comprising a cooling agent and said freshly prepared pellets during the manufacturing of said pellets.

2. The method as described in claim 1, wherein said cooling agent is water.

3. The method as described in claim 1, wherein said polyolefin pellets are high melt flow polyolefin pellets.

4. The method as described in claim 1, wherein said polyolefin pellets are poly-1-butene homopolymer or poly-1-butene copolymer pellets.

5. The method as described in claim 1, wherein said polyolefin pellets are high melt flow poly-1-butene-ethylene copolymer pellets.

6. The method as described in claim 1, wherein said high density polyethylene has a density of above 0.93 g/cc at 25° C.

7. The method as described in claim 6, wherein said fatty acid metallic surfactant is a metal salt of a fatty acid having 12 to 22 carbon atoms, wherein said metal of the metal salt is selected from the group consisting of Group IA metal, Group IIA metal, aluminum, zinc, and cadmium (Cd).

8. The method as described in claim 7, wherein said fatty acid metallic surfactant is selected from the group consisting of zinc stearate, zinc oleate, aluminum stearate, aluminum oleate, calcium stearate, calcium oleate, lithium stearate, lithium oleate, sodium stearate, and sodium oleate.

9. The method as described in claim 7, wherein said polyolefin polymer is butene-1-ethylene copolymer.

10. The method as described in claim 5, wherein said butene-1-ethylene copolymer contains from about 0.1 to 8 wt % ethylene.

11. The method as described in claim 1 wherein said fatty acid metallic surfactant is added in an amount of from about 0.01 to about 0.6 wt % of said cooling agent, and said high density polyethylene is added in an amount of from about 0.03 to about 1.0 wt % of said cooling agent.

12. The method as described in claim 1 wherein said fatty acid metallic surfactant is added in an amount of from about 0.07 to about 0.2 wt % of said cooling agent, and said high density polyethylene is added in an amount of from about 0.09 to about 0.4 wt % of said cooling agent.

13. A poly-1-butene pellet product made by a method effective for minimizing the agglomeration of freshly manufactured poly-1-butene homo- or copolymer pellets, which method comprising adding an effective amount of pelletizing aid package consisting essentially of a high density polyethylene and a fatty acid metallic surfactant to a device comprising a cooling agent and said freshly prepared pellets during the manufacturing of said pellets.

* * * * *